United States Patent
Kolar et al.

(10) Patent No.: US 11,125,586 B2
(45) Date of Patent: Sep. 21, 2021

(54) SENSOR ARRANGEMENT AND METHOD FOR OPERATING A SENSOR ARRANGEMENT

(71) Applicant: Ams AG, Premstaetten (AT)

(72) Inventors: Dalibor Kolar, Graz (AT); Gerhard Oberhoffner, Seiersberg (AT); Simone Sabatelli, Graz (AT); Dominik Ruck, Graz (AT)

(73) Assignee: AMS AG, Premstaetten (AT)

( * ) Notice: Subject to any disclaimer, the term of this patent is extended or adjusted under 35 U.S.C. 154(b) by 641 days.

(21) Appl. No.: 16/076,680

(22) PCT Filed: Feb. 13, 2017

(86) PCT No.: PCT/EP2017/053150
§ 371 (c)(1),
(2) Date: Aug. 8, 2018

(87) PCT Pub. No.: WO2017/140619
PCT Pub. Date: Aug. 24, 2017

(65) Prior Publication Data
US 2019/0063958 A1    Feb. 28, 2019

(30) Foreign Application Priority Data

Feb. 17, 2016 (EP) .................................. 16156156

(51) Int. Cl.
*G01D 5/244* (2006.01)
(52) U.S. Cl.
CPC .................. *G01D 5/2448* (2013.01)
(58) Field of Classification Search
CPC .............................. B23H 7/20; G01D 5/2448
See application file for complete search history.

(56) References Cited

U.S. PATENT DOCUMENTS 4,714,900 A * 12/1987 Sata .................. H03K 4/06
                                                    327/108
4,853,610 A *  8/1989 Schade, Jr. ........ G05F 3/267
                                                    323/316
(Continued)

FOREIGN PATENT DOCUMENTS

JP     H06303795 A    10/1994
JP     H08160114 A     6/1996
(Continued)

OTHER PUBLICATIONS

Improvements of CMOS Hall Microsystems and Applications for Absolute Angular Position Measurements, Michel Demierre, EPFL Sep. 2003 [chapter 6.1.2 (Sensitivity Mismatch)].
(Continued)

*Primary Examiner* — Manuel A Rivera Vargas
*Assistant Examiner* — Yaritza H Perez Bermudez
(74) *Attorney, Agent, or Firm* — MH2 Technology Law Group LLP

(57) ABSTRACT

A sensor arrangement has a current mirror structure that is configured to provide respective base currents at each of a plurality of output current paths based on an input current. For each of the output current paths, a respective adjustment current source is provided that is digitally controllable and is connected to the respective output current path for adjusting the base current of said output current path. For each of the output current paths, a current biased sensor element is coupled in said output current path. The sensor arrangement further has a selection element for selectively connecting one of the output current paths to an evaluation block based on a selection signal. The evaluation block is configured to generate a sensing value corresponding to a resulting current in the connected output current path, to compare the sensing value with an average value, and to update the average value based on the sensing value. A digital control is adapted for
(Continued)

generating the selection signal and for digitally adjusting the respective adjustment current source of the connected output current path based on the comparison result.

15 Claims, 4 Drawing Sheets

(56) References Cited

U.S. PATENT DOCUMENTS 9,678,153 B2 * 6/2017 Steffens ............ G01R 31/31726
2012/0007757 A1 * 1/2012 Choe .................. H03M 1/1061
341/120

FOREIGN PATENT DOCUMENTS

| JP | 2003078395 A | 3/2003 |
| JP | 2013181946 A | 9/2013 |

OTHER PUBLICATIONS

Popovic, R. S.: "Hall Effect Devices" second ed., Institute of Physics Publishing, Bristol, 2004 [chapter 5.6.3 (Reducing Offset and 1/f Noise)].

* cited by examiner

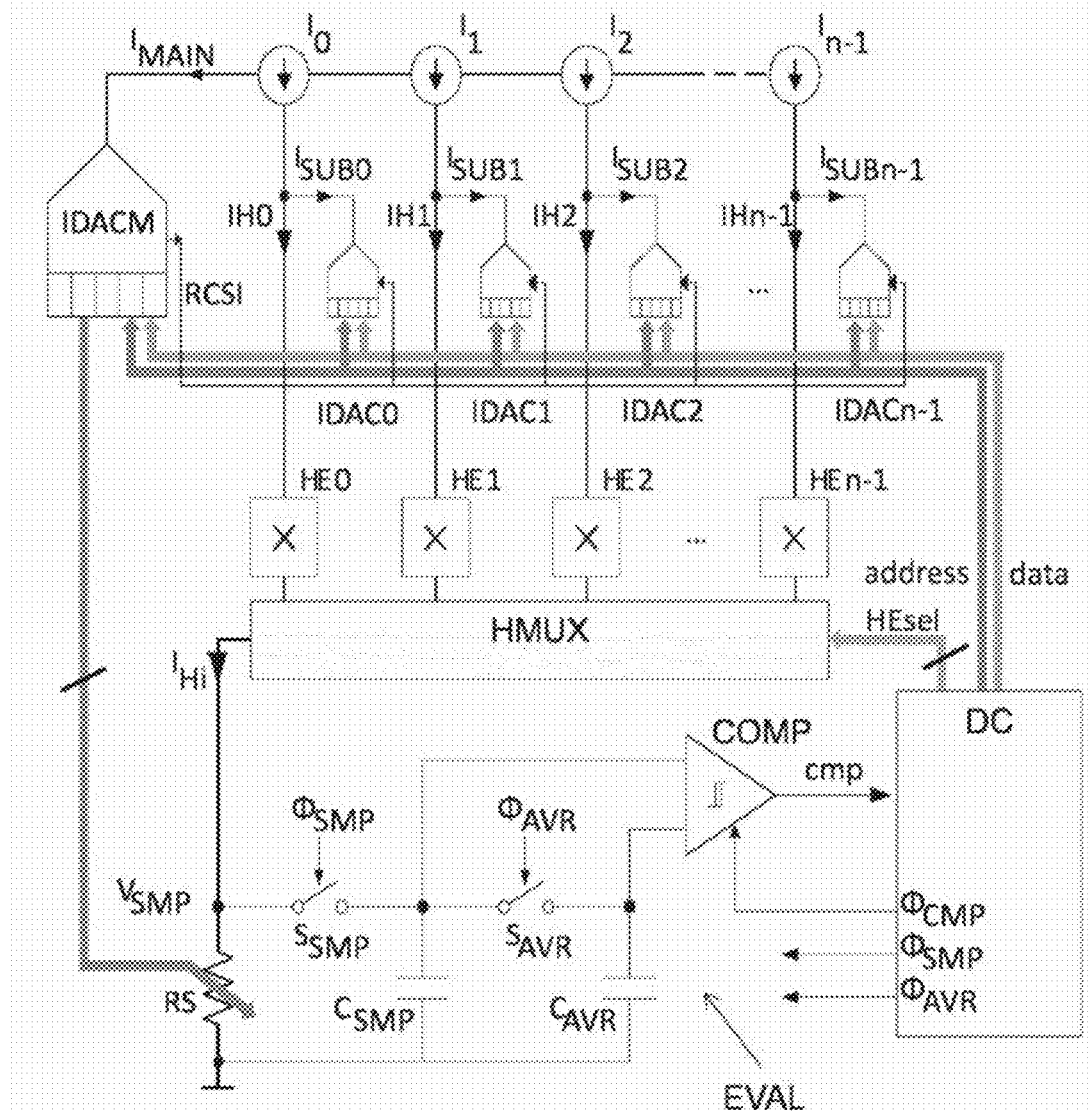

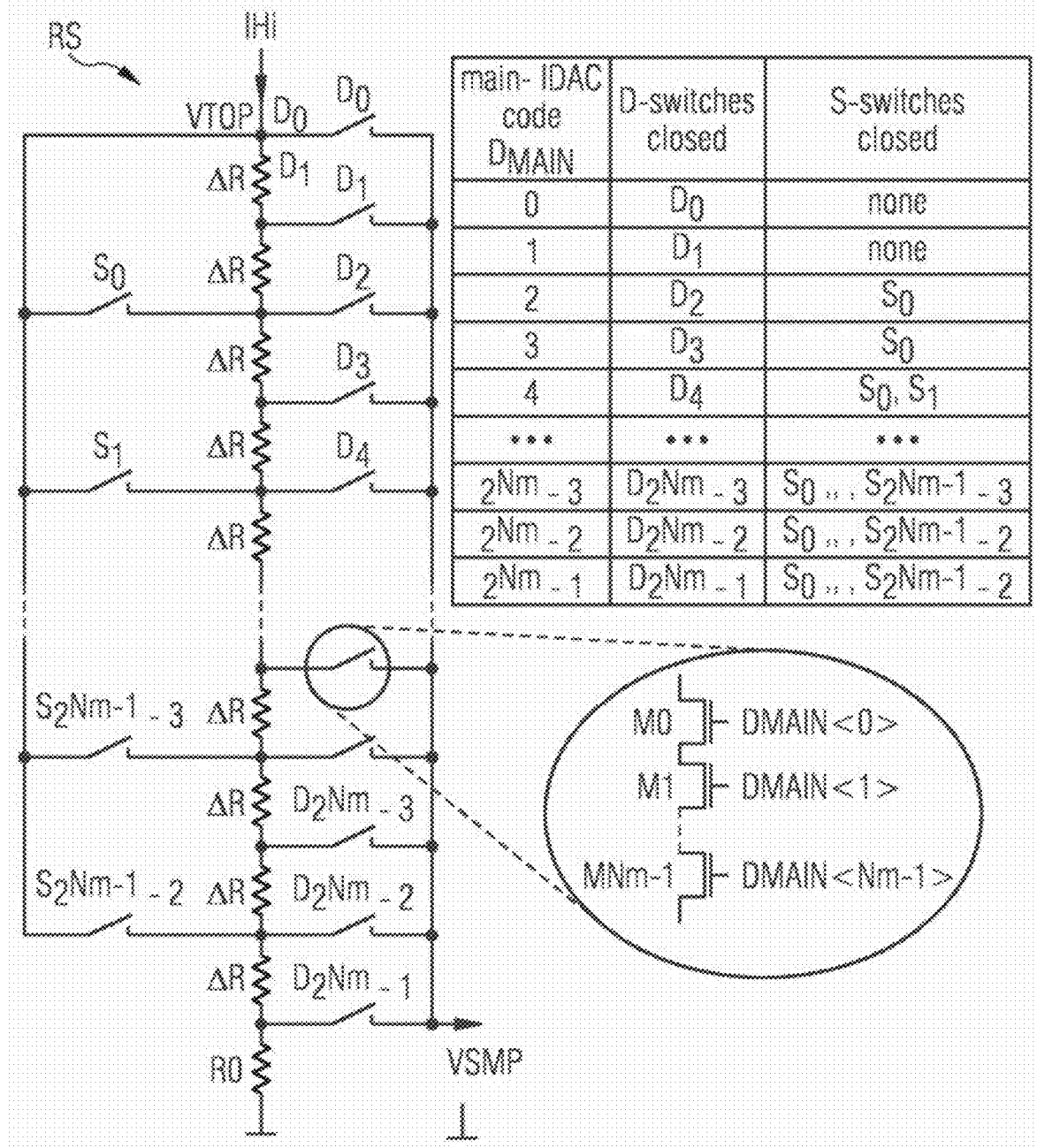

SENSOR ARRANGEMENT AND METHOD FOR OPERATING A SENSOR ARRANGEMENT

BACKGROUND OF THE INVENTION

The present disclosure relates to a sensor arrangement, in particular with a plurality of current biased sensor elements. The disclosure further relates to a method for operating a sensor arrangement that particularly employs a plurality of current biased sensor elements.

In various sensor applications a plurality of current biased sensors are used, where sensor biasing conditions are desired to match. An example is an application for angular position measurement systems based on Hall sensors or other Hall elements.

Taking angular position measurement systems as an example, regularly CMOS Hall elements are employed for measuring an angle of a rotating magnetic source like a permanent magnet. For the purpose of such measurement, such a system for example consists of several symmetrically arranged Hall elements. Depending on geometrical projections of the magnetic field vector onto the Hall element's axis, the corresponding Hall voltages are generated and used to determine the angle and magnitude of a magnetic field that is the measured quantity. The measured Hall voltage for a Hall element is directly proportional to the magnetic field to be measured and to a bias current of the Hall element. The proportionality is determined by a constant factor acting as the sensitivity of the Hall element.

Having multiple sensor elements, their sensitivity usually differs from element to element. For example, non-linear errors arise from sensor non-linearities, residual offset, offset drifts, sensitivity drift and sensitivity mismatch. For Hall elements, an offset can be efficiently reduced by know techniques like the current-spinning method, which for example is described in R. S. Popovic, Hall Effect Devices, second ed., Institute of Physics Publishing, Bristol, 2004, Chapter 5.6.3, and which leaves only a fraction of the original offset as the residual offset.

According to the above description, also a mismatch in the bias currents of the sensor elements can cause non-linearities. To overcome such a mismatch, the bias currents may be provided as matched currents for all sensor elements. Typically matching of currents causes the need for large devices and it influences the area being used. However, even with the large devices, any mismatch resulting from time or temperature related variations, also known as a drift, is then unaccounted for. Hence, the performance of the sensor arrangement is degraded.

SUMMARY OF THE INVENTION

The present disclosure provides an improved concept for sensor arrangements with a plurality of current biased sensor elements with an improved sensor performance.

According to the improved concept, respective base currents for the plurality of current biased sensor elements are generated by mirroring a common input current. The improved concept is based on the idea that each of these base currents can be adjusted with a respective adjustment current provided by an associated adjustment current source that is digitally controllable. The resulting, adjusted base currents are measured separately and compared to an average value in order to digitally adjust the corresponding adjustment current source. Furthermore, each of the adjusted base currents is used for updating the average value. For example, the average value corresponds to the mean value of the adjusted base currents.

Hence, with the improved concept, a setting can be found which minimizes the effect of bias currents onto the overall measurement performance while at the same time allowing an individual optimum bias current setting for each sensor element. As the control loop can also be employed during operation of the sensor arrangement, not only static mismatches between sensor elements but also drift effects can be accounted for.

Known methods for ensuring bias current matching are regularly enlarging the area of current mirrors. This can be accomplished by one time calibration to improve the matching, but the drift over time and temperature still remains primarily because of the unknown variation of the concerning parameters. Therefore, it is not possible to make adjustments for these variations by programming with reasonable effort. In contrast, according to the improved concept the currents are continuously equalized in situ during the normal operation, and by doing so also the effects of drift are minimized. The improved concept is particularly applicable to such sensors which require current for biasing and additionally call for matching of their biasing conditions.

As the improved concept employs a feedback loop for making current adjustments, the matching is no longer strictly depending on the area and the current mirrors can thus be smaller.

It should be noted that the improved concept is also compatible with, e.g. the current spinning technique and automatic gain control, such that it can easily be combined with known performance enhancing techniques. Further, the improved concept is not limited by the number of sensor elements to be supplied with bias currents.

An embodiment of the sensor arrangement according to the improved concept comprises a current mirror structure that is connected to an input current path and to a plurality of output current paths. The current mirror structure is configured to provide a respective base current at each of the output current paths based on an input current at the input current path. The sensor arrangement comprises, for each of the output current paths, a respective adjustment current source that is digitally controllable and is connected to the respective output current path for adjusting the base current of said output current path. For example, each adjustment current source draws current from the output current path to perform the adjustment.

The sensor arrangement further comprises, for each of the output current paths, a current biased sensor element coupled in said output current path. The sensor arrangement further comprises a selection element for selectively connecting one of the output current paths to an evaluation block based on a selection signal. For example, only one of the output current paths can be selected at a time.

The evaluation block is configured to generate a sensing value corresponding to a resulting current in the connected output current path, to compare the sensing value with an average value, and to update the average value based on the sensing value. A digital control of the sensor arrangement is adapted for generating the selection signal and for digitally adjusting the respective adjustment current source of the connected output current path based on the comparison result.

For example, if the sensing value is greater than the average value, the current to be drawn from the respective output current path by the respective adjustment current source is digitally increased. In an analog fashion, the current to be drawn is digitally decreased if the sensing value is smaller than the average value. However, the adjustment direction may also be reversed if the adjustment current sources are arranged such that they increase the resulting base current in the respective output current path.

For example, the adjustment current sources are implemented as current digital-to-analog converters, also known as IDACs. The digital control can be adapted to provide digital adjustment values to the adjustment current sources, respectively the current digital-to-analog converters or IDACs.

In various implementations of the sensor arrangement, the digital control is adapted to sequentially connect each of the output current paths to the evaluation block by providing the selection signal to the selection element. Preferably, all of the output current paths being available are sequentially selected during one measurement cycle. However, the individual sequence of output current paths may differ in different measurement cycles.

According to various implementations, the digital control is adapted to commonly adjust an operating range of the adjustment current sources. The adjustment of the operating range, for example, is performed based on an evaluation of the digital adjustment values for all of the adjustment current sources.

According to some implementations, the evaluation block is configured to generate the sensing value as a voltage over a sensing resistor resulting from the current in the connected or selected output current path. The evaluation block is further configured to sample the sensing value with a sampling capacitor during a sampling phase, and to compare the voltage over the sampling capacitor with an average voltage over an average capacitor during a comparison phase within the sampling phase. In such a configuration, the average voltage corresponds to the average value. The evaluation block is finally configured to update the average value by performing a charge transfer between the sampling capacitor and the average capacitor during an averaging phase after the sampling phase. For example, the sampling capacitor and the average capacitor are connected in parallel for the charge transfer. Preferably a capacitance of the average capacitor is higher, in particular significantly higher, than the capacitance of the sampling capacitor.

In some implementations, where the sensing value is generated as a voltage over a sensing resistor, the sensor arrangement may further comprise a main current digital-to-analog converter or main IDAC for generating the input current based on a digital main current value. The sensor arrangement or the main current digital-to-analog converter itself are configured to adjust a value of the sensor arrangement based on the digital main current value. This, for example, allows to keep the voltage over the sensing resistor in the same measurement range, at least in the same order of magnitude, resulting in a balanced measurement precision in the evaluation block.

For example, the sensor arrangement or the main current digital-to-analog converter are configured to increase the value of the sensing resistor if the digital main current value decreases, and to decrease the value of the sensing resistor if the digital main current value increases.

Also in other implementations a main current digital-to-analog converter for generating the input current based on a digital main current value can be employed. For example, the main current digital-to-analog converter is configured to perform a range adjustment for each of the adjustment current sources by adjusting a bias current of the adjustment current sources based on the digital main current value. For example, there can be a constant ratio between the main current digital-to-analog converter and the bias current for the adjustment current sources, respectively the adjustment IDACs. By changing the input current, the range of the adjustment current sources is changed too. Hence, there is a fixed ratio between the input current and the range of the adjustment current sources. Therefore, the bias current of the adjustment current sources is set based on the digital main current value.

In various implementations the selection element is adapted to selectively connect the output current paths either to the evaluation block or to a dummy load based on the selection signal. For example, the selected output current path is connected to the evaluation block while the other, non-selected output paths are connected to respective individual dummy loads like dummy resistors. Hence, the current in the non-selected current paths flows into the associated dummy load, ensuring similar operating conditions as with the connection to the evaluation block.

Although Hall elements or Hall sensors are taken as an example for current biased sensor elements, the improved concept may also be used with other current biased sensor elements like magnetoresistive sensors, NOx sensors or other gas sensors, resistance temperature detectors, RTDs, MEMS transducers or others. More generally speaking, the improved concept is particularly applicable to such sensors which require current for biasing and additionally call for matching of their biasing conditions.

The improved concept has been described so far in conjunction with the structural features of a sensor arrangement. However, the improved concept can also be implemented in a method for operating a sensor arrangement. For example, such a method comprises the provision of respective base currents at each of a plurality of output current paths based on an input current at an input current path. For each of the output current paths, the base current of said output current path is adjusted with an associated adjustment current source that is digitally controllable and is connected to said output current path. For each of the output current paths, the adjusted base current is provided to a current biased sensor element coupled in said output current path. One of the output current paths is selected based on a selection signal. A sensing value is generated that corresponds to the adjusted based current in the selected output current path. The sensing value is compared with an average value. Based on the comparison result, the respective adjustment current source of the selected output current path is digitally controlled. The average value is updated based on the sensing value.

For example, the selection signal is generated such that each of the output current paths is selected in a sequential fashion. Hence, all output current paths are employed in the comparison and controlling steps.

For example, an operating range of the adjustment current sources can be commonly adjusted.

In some implementations the input current is generated based on a digital main current value. The sensing value is generated as a voltage over a sensing resistor resulting from the adjusted base current in a selected output current path. A value of the sensing resistor is adjusted based on the digital main current value.

For example, the value of the sensing resistor is increased if the digital main current value decreases, and the value of the sensing resistor is decreased if the digital main current value increases.

Further embodiments of a method for operating a sensor arrangement become readily apparent from the various implementations of the sensor arrangement described above.

The improved concept will be described in detail below for several embodiments with reference to the drawings. Identical reference numerals designate elements or components with identical functions. In so far as elements or components correspond to one another in function, a description of them will not be repeated in each of the following figures.

BRIEF DESCRIPTION OF THE DRAWINGS

In the drawings:

FIG. 2 shows a further exemplary embodiment of a sensor arrangement according to the improved concept;

FIG. 6 shows an exemplary embodiment of a sensing resistor.

DETAILED DESCRIPTION

Figure 1:
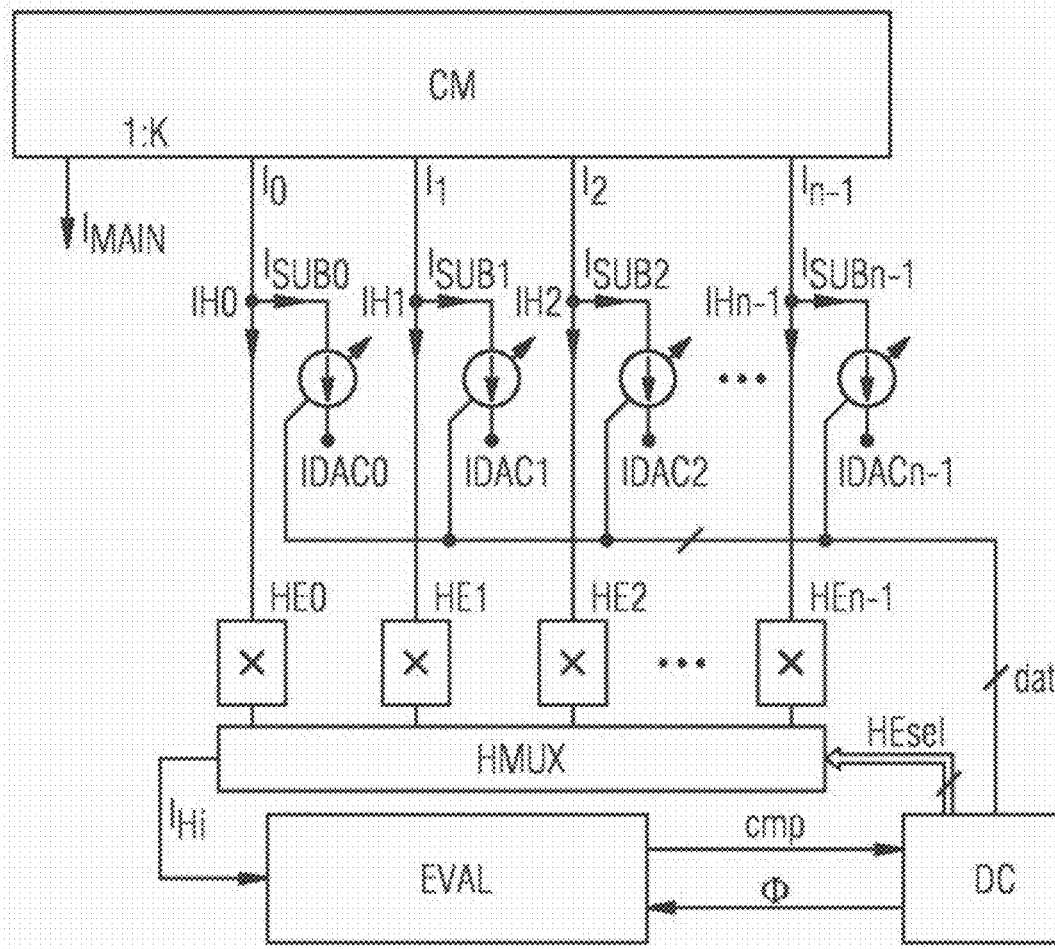
FIG. 1 shows an exemplary embodiment of a sensor arrangement according to the improved concept.

FIG. 1 shows a block diagram of an exemplary embodiment of a sensor arrangement according to the improved concept. The sensor arrangement comprises n current biased sensor elements HE0, HE1, . . . HEn-1, which may for example be embodied as Hall sensors. Each of the sensor elements HE0, HE1, . . . HEn-1 is coupled in a respective output current path between a current mirror structure CM and a selection element HMUX. Actual measurement outputs of the sensor elements are not shown here for reasons of a better overview. Additionally, the actual sensor outputs are not taken into account for the improved concept.

The current mirror structure CM is connected to an input current path for receiving an input current IMAIN, which forms the basis for respective base currents I0, I1, I2, . . . , In-1 at the output current paths. At each output current path, a respective adjustment current source IDAC0, IDAC1, . . . , IDACn-1 is connected, which is individually and digitally controllable by respective data words provided from a digital control DC. Accordingly, each of the adjustment current sources draws a respective adjustment current ISUB0, ISUB2, . . . , ISUBn-1 from the associated base current I0, I1, I2 . . . , In-1, such that an adjusted base current IH0, IH1, IH2, . . . , IHn-1, flows to the respective sensor elements as a respective bias current. As a consequence, the bias current for each sensor element can be set individually, in particular by means of the respective adjustment current source.

The sensor arrangement further comprises an evaluation block EVAL that is provided with a resulting current in one of the current paths that is selected by the selection element HMUX in response to a selection signal HEsel.

The evaluation block is generally configured to generate a sensing value corresponding to the resulting current in the connected respectively selected output current path, to compare the sensing value with an average value, and to update the average value based on the sensing value. A comparison result cmp is provided to the digital control DC. The digital control DC generates the selection signal HEsel and control signals $\Phi$ for the evaluation block. Additionally, the digital control is adapted for digitally adjusting the respective adjustment current source of the connected, respectively selected output current path based on the comparison result.

Various implementations for providing the input current IMAIN and for defining the adjustment current sources IDAC0, IDAC1, . . . , IDACn-1 are possible. Also the functionality of the selection element HMUX and the evaluation block EVAL can be implemented in various ways. For example, the evaluation block EVAL could be implemented with digital circuitry such that the comparison and/or the average forming is performed in a digital domain. However, as an example, a more detailed implementation of the block diagram of FIG. 1 is shown in the embodiment of a sensor arrangement in FIG. 2.

For example, the input current IMAIN is generated by a current digital-to-analog converter IDACM, which generates the input current IMAIN based on a digital main current value DMAIN.

In a similar fashion, the adjustment current sources are also implemented as current digital-to-analog converters or IDACs in this exemplary embodiment.

It may also be possible to provide respective digital adjustment values to the adjustment current sources IDAC0, IDAC1, . . . , IDACn-1 and the main current digital-to-analog converter IDACM with separate control lines. However, in the present example embodiment only respective common data lines are provided to each of the IDACs. Additionally, an address bus is provided, which allows to select one of the IDACs as a target for a digital current value. Such an addressing scheme may in particular be advantageous for higher numbers n of current paths, respectively sensor elements, respectively adjustment current sources.

The evaluation block EVAL is implemented with a sensing resistor RS for generating a voltage over the sensing resistor RS as the sensing value VSMP. The evaluation block EVAL further comprises a sampling capacitor CSMP that is selectively connected in parallel to the sensing resistor RS by means of a sampling switch SSMP controlled by a control signal $\Phi$SMP. The high potential terminal of the sampling capacitor CSMP is connected to a first input of a comparator COMP. A second input of the comparator COMP is connected to a high terminal of an average capacitor CAVR that is further connected to the high potential terminal of the sampling capacitor CSMP by means of a switch SAVR controlled by a control signal $\Phi$AVR. The comparator COMP provides a comparison result cmp to the digital control DC controlled by a further control signal $\Phi$CMP. The control signals $\Phi$AVR, $\Phi$SMP and $\Phi$CMP are provided by the digital control DC.

During operation of the sensor arrangement, after one of the output current paths has been selected, the sensing value is generated as the voltage over the sensing resistor RS resulting from the current IHi of the selected output current path i, $0>i>n-1$. The sensing value VSMP is sampled with the sampling capacitor CSMP during a sampling phase determined by the control signal $\Phi$SMP. Respective control signals $\Phi$SMP, $\Phi$CMP, $\Phi$AVR can for example be seen in the signal time diagram of FIG. 3.

Accordingly, the voltage over the sampling capacitor CSMP is compared with an average voltage over the average capacitor CAVR during a comparison phase within the sampling phase. As can be seen, the comparison phase may be situated at the end of the sampling phase $\Phi$SMP. The average value over the average capacitor CAVR is updated by performing a charge transfer between the sampling capacitor CSMP and the average capacitor CAVR during an averaging phase after the sampling phase, determined by the control signal $\Phi_{AVR}$.

FIG. 2 further discloses a connection between the main current digital-to-analog converter IDACM and the sensing resistor RS, which allows adjusting the value of the sensing resistor RS depending on the digital main current value DMAIN. This will be explained later in conjunction with FIG. 6.

Various types of current biased sensor elements could be used with a sensor arrangement as shown in FIGS. 1 and 2. However, some additional explanation will be given taking Hall sensor elements, in particular CMOS Hall sensor elements as a non-limiting example.

In an example implementation with a plurality of such Hall sensor elements, each Hall sensor element measures the magnetic field intensity at respective sensor position. A proportionality between the field B and the resulting Hall voltage $V_H$ for a single Hall element is given by $$V_H = B \cdot I_H \cdot S_I \qquad (1)$$

where $S_I$ is the current related sensitivity and $I_H$ is the Hall element bias current. By changing the current $I_H$, the proportionality between the magnetic field and the corresponding Hall voltage is also changed, given possibility for setting the sensitivity to overcome magnetic variation.

Referring to FIG. 1 and FIG. 2, because of the possible sensitivity variation, the main input current IMAIN can be varied to make suitable sensitivity adjustments in equation (1). An absolute value of each Hall element bias current is set with the main input current IMAIN, which is copied into each output current path with, for example 1:K ratio. The copied currents most probably are not perfectly matched and they can be expressed through the mismatch errors $\varepsilon_1$ according to:

$$I_i = K \cdot I_{main}(1 - \varepsilon_i) \quad i = 0, 1, K, n, \qquad (2)$$

wherein $I_i$ is the current in the i-th output current path provided from the current mirror structure CM. Supposing that $K \cdot I_{MAIN}$ is in fact the mean value of currents $I_i$ sourced by respective current sources, the sum of mismatch errors then equals to zero. The relative bias current adjustment between Hall elements is facilitated by the adjustment current sources IDAC0, IDAC1, ..., IDACn-1. The mirror current $I_i$ is subtracted by the adjustment current $I_{SUBi}$ resulting in the bias current $I_{Hi}$ given by $$I_{Hi} = I_i - I_{SUBi} \qquad (3)$$

By combining equation (2) and equation (3) together, the bias current $I_{Hi}$ for the i-th Hall element can be determined:

$$I_{Hi} = K \cdot I_{MAIN}\left[1 - \left(\varepsilon_i + \frac{I_{SUBi}}{K \cdot I_{MAIN}}\right)\right] \qquad (4)$$

It is suggested by equation (4) that to balance $\varepsilon_i$, the range of the adjustment current sources IDAC0, IDAC1, ..., IDACn-1 firstly should be ratiometric to $I_{MAIN}$ and consequently should be set depending on it, and secondly the range should be designed so that it accommodates the largest expected mismatch error. The bit-resolution Ns of the adjustment current sources IDAC0, IDAC1, ..., IDACn-1 directly puts the theoretical limit on the achievable residual mismatch error.

The system evaluates Hall Element currents $I_{H0}$, $I_{H1}$, $I_{H2}$, ..., $I_{Hn-1}$ by consecutively diverting each of them to the evaluation block EVAL, respectively the common sensing resistor RS shared between all Hall Elements. Given the fact the measurement respectively the resistor RS is shared, its precision is of no importance.

Referring to the example embodiment of FIG. 2, the voltage drop VSMP across RS for a particular Hall Element is used to charge the capacitor CSMP. The resulting voltage is given by $$V_{SMPi} = R_S K \cdot I_{MAIN}\left[1 - \left(\varepsilon_i + \frac{I_{SUBi}}{K \cdot I_{MAIN}}\right)\right] \qquad (5)$$

The average capacitor CAVR implements a passive filter that is used to average the sampled voltages related to the resulting bias currents $I_{H0}, I_{H1}, I_{H2}, \ldots, I_{Hn-1}$. This averaged voltage, appearing as the voltage at capacitor CAVR, is used to compare the voltage sampled at capacitor CSMP. The comparison gives the information if the current through the selected Hall Element is smaller or larger than the average value. After the comparison is made by the comparator COMP, the charge stored in capacitor CSMP is discharged to capacitor CAVR. The capacitor CAVR preferably is of larger capacitance than capacitor CSMP. The control signals $\Phi_{SMP}$ and $\Phi_{AVR}$ for charging and discharging are shown as an example in FIG. 3 and provided by the digital control DC. By repetitively charging capacitor CSMP and discharging it onto capacitor CAVR, the value proportional to the average of Hall Element currents is produced on capacitor CAVR. It can be found that the value stored at the capacitor CAVR settles to the value given by $$\overline{V}_{AVR} = R_S K \cdot I_{MAIN}\left[1 - \frac{\overline{I}_{SUB}}{K \cdot I_{MAIN}}\right]. \qquad (6)$$

The average Hall Element current is also changed by the average of sub-IDAC currents $\overline{I}_{SUB}$ but this fact does not change currents in respect to each other. It can be shown that $\overline{I}_{SUB}$ can be chosen arbitrarily, but it may need to be controlled to avoid saturation. To maximise the usage of the range of the adjustment current sources IDAC0, IDAC1, ..., IDACn-1, $\overline{I}_{SUB}$ is preferably set in the middle of the range.

Prior to capacitor CSMP being discharged to capacitor CAVR, the latched comparator COMP at the rising edge of $\Phi_{SMP}$ makes comparison between the voltages at capacitors CSMP and CAVR. The result cmp of comparison indicates the direction in which the corresponding adjustment current source IDACi is to be changed. The objective of the change is to equalise the equations (5) and (6) giving equation (7) as the result.

$$\varepsilon_i + \frac{I_{SUBi} - \overline{I}_{SUB}}{K \cdot I_{MAIN}} = 0 \qquad (7)$$

In other words, equation (7) means that the mismatch error $\varepsilon_i$ is balanced by the current $I_{SUBi}$ to fulfil this objective. If for instance VSMP of the selected output current path is larger than the average value (i.e. because of $\varepsilon_i < 0$, the Hall Element current is too high), the value for the corresponding adjustment current source IDACi is increased consequently reducing the Hall Element current as defined in equation (3). If it is the other way around, the value for the corresponding adjustment current source IDACi is to be decreased. Ultimately, this trimming procedure acts towards minimising the discrepancy between Hall Element currents $I_{H0}$, $I_{H1}$, $I_{H2}$, . . ., $I_{Hn-1}$ and settling them down at the level of the mean value.

Figure 4:
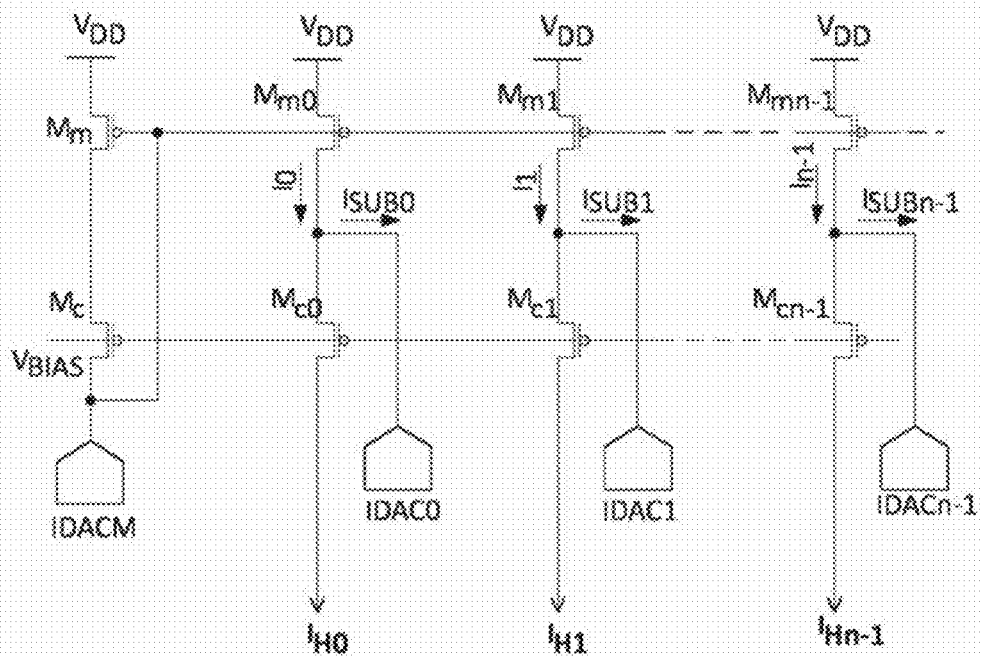
FIG. 4 shows an example implementation detail within a sensor arrangement according to the improved concept.

Referring now to FIG. 4, the Hall Element bias generator may be implemented as a high-swing cascode current mirror CM with the adjustment currents ISUB0, ISUB1, . . . , ISUBn-1 being taken from the nodes between mirror transistors $M_{m0}$, $M_{m1}$, . . . , $M_{mn-1}$ and cascode transistors $M_c$, $M_{c0}$, $M_{c1}$, . . . , $M_{cn-1}$. An input current mirror transistor $M_m$ is provided in the input path for the input current IMAIN. The cascode transistors $M_{c0}$, $M_{c1}$, . . . , $M_{cn-1}$ are driven by a common bias voltage VBIAS. An advantage of taking the current at this point is that in this case all the adjustment current sources IDAC0, IDAC1, . . . , IDACn-1 operate at the same voltage.

Figure 5:
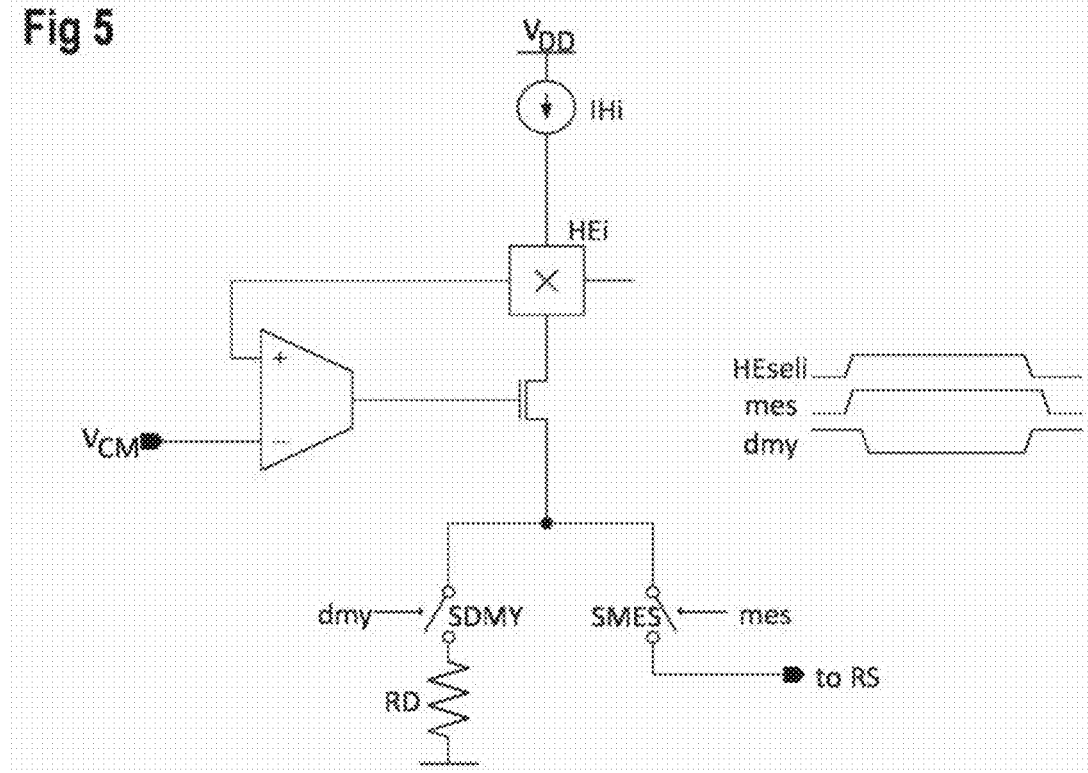
FIG. 5 shows an implementation detail of a selection element.

Referring now to FIG. 5, an example implementation of the selection element HMUX is shown, which performs the selection of the Hall Element current IHi to be measured. Respective control signals are provided by the digital control DC. Control signals mes and dmy for controlling the switches SMES and SDMY are e.g. generated depending on the active selection signal HEseli for the respective Hall Element current IHi. In this example implementation, also a common mode regulator for setting a common mode voltage of the Hall element is foreseen. It is desirable that the current flow is not obstructed by diverting the Hall Element current IHi to RS and that only the selected (measured) Hall Element current is diverted. When the Hall Element current is not measured, the current flows into a dummy resistor RD, ensuring similar operating conditions for the common mode regulator. The overlapping phases shown in FIG. 5 ensure that the current flow is not broken during switching between the resistors RS and RD.

To optimise or maximise $V_{SMP}$ over the entire range of the main current digital-to-analog converter IDACM, the resistance RS is controllable by the setting or control word DMAIN having a bit-resolution of Nm. For example, the smaller the current IMAIN, the higher the resistance value of RS and vice versa. An example circuit implementation is shown in FIG. 6. The resulting voltage drop is given by equation (8). The range of resistance RS is set by the resistance value $R_0$ and $\Delta R$.

$$V_{SMP} = [R_0 + \Delta R(2^{Nm} - 1 - D_{MAIN})] \cdot I_{Hi} \quad (8)$$

All switches are controllable by the control word DMAIN. Each code value for the main current digital-to-analog converter IDACM matches the closing of a corresponding D-switch $D_0$, $D_1$, . . . , $D_{2^{Nm}-1}$. The unused resistors $\Delta R$ are bypassed by S-switches $S_0$, $S_1$, . . . , $S_{2^{Nm-1}-2}$ to keep the voltage VTOP sufficiently low to maintain the common mode regulation. The states of switches for a given code value of the control word DMAIN are given in the table shown along with FIG. 6.

For example, each of the D-switches $D_0$, $D_1$, . . . , $D_{2^{Nm}-1}$ comprises a series of MOS transistors M0, M1, . . . , MNm-1, which at the same time act as the switch decoder. To this end, respective control signals DMAIN<0>, DMAIN<1>, . . . , DMAIN<Nm-1> are provided to the transistors M0, M1, . . . , MNm-1 in direct or inverted form, as it is necessary to close the respective D-switch for a given code value.

The algorithm making current adjustments according to equation (7) can be implemented in the digital control DC. The algorithm inter alia relies on the following prerequisites:

The Hall element currents differ because of the mismatch causing relative errors between the Hall element currents. The errors remain the same if the setting for all adjustment current sources are changed in the same way. For example, the error is not affected if the same amount is added or subtracted from the settings of all adjustment current sources or adjustment IDACs. It is assumed that a setting exists for the adjustment current sources which minimizes the relative errors between the Hall element currents. An objective of the algorithm is to find these settings.

An example of a pseudocode for the algorithm according to the improved concept is shown in the following:

```
n = number of IDACs
Ns = bit resolution of IDACS
set DSUBi = 2^(Ns-1) (for i = 0:n-1)
DSUBmean = n*2^(Ns-1)
loop forever
    // measurement phase
    sum = 0
    for i = 0:n-1
        divert current of HEi to RS
        generate clock signals for measurement and comparison
        read cmp // read the comparator state
        if cmp == true
            if DSUBi == 2^Ns-2
                DSUBmean = DSUBmean - n
            else
                increment DSUBi
            end
        else
            if DSUBi == 1
                DSUBmean = DSUBmean + n
            else
                decrement DSUBi
            end
        end
        sum = sum + DSUBi
        if i==n-1
            if sum < DSUBmean-n
                increment all DSUBi
            elseif sum > DSUBmean+n
                decrement all DSUBi
            end
        end
    end
    // transfer phase
    for i = 0:n-1
        write DSUBi to IDACi
    end
    wait // wait phase before next adjustment cycle
end
```

Figure 3:
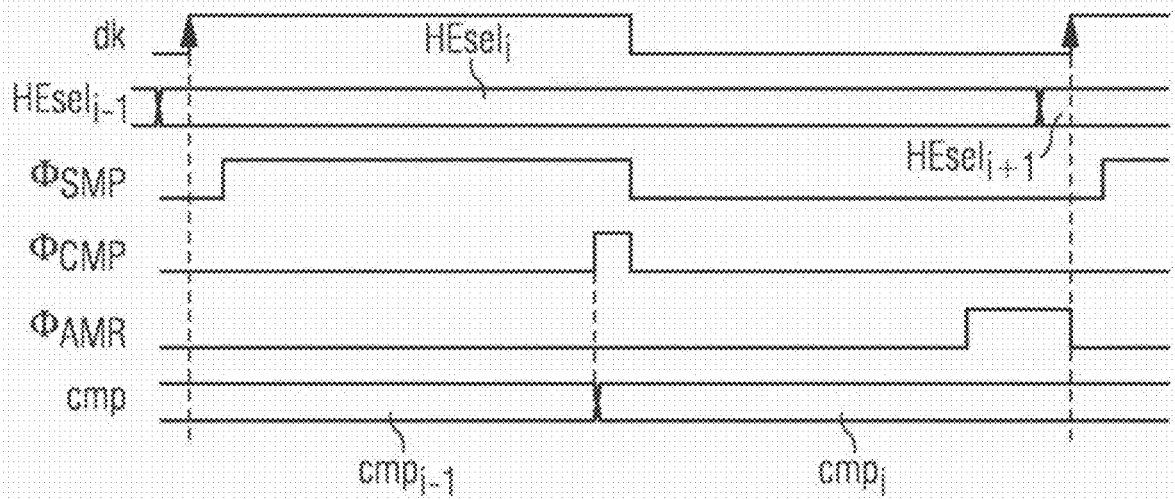
FIG. 3 shows a signal time diagram of signals being employed in an exemplary embodiment of a sensor arrangement.

For example, the algorithm itself consists of three distinctive phases: A measurement phase, a transfer phase and a wait phase. Preferably, these phases exchange perpetually in this order. During each phase, the current of every output current path is sequentially diverted by the selection element HMUX to the evaluation block EVAL or the sensing resistor RS. Respective control signals, as for example shown in FIG. 3, are generated by the digital control DC. The continuous sampling and discharging throughout all phases ensures that the mean value at the average capacitor CAVR does not deteriorate over time. The selection of a respective output current path or the respective Hall element current is controlled by the selection signal HEsel.

For the currently selected Hall element current IHi, $0 \le i \le n-1$, in a measurement phase, the comparison result cmp is taken and, depending on it, the adjustment value of the corresponding adjustment current source IDACi is incremented or decremented. Preferably care is taken to avoid overflow. The respective control values DSUBi are continuously added and at the end of each measurement phase, the sum is compared to a target value $n*2^{Ns-1}$. All settings of the adjustment current sources, i.e. all control values DSUBi are incremented, decremented or unchanged, depending on the relation of the sum to the target value. In the event that the value of DSUBi reaches the value $2^{Ns}-2$, the mean value DSUBmean is subtracted by the number n of adjustment current sources. On the other end of the range, if the control value DSUBi reaches 1, n is added to DSUBmean. Acting in this way, the algorithm attempts to set the mean value of DSUBi in the middle of the available range of the adjustment current sources.

In the transfer phase the settings DSUBi are transferred to the associated adjustment current sources IDACi, $0 \leq i \leq n-1$.

The wait phase serves as a settling period. Such an arrangement of phases is particularly useful to prevent instability issues.

In those situations where the currents of a few adjustment current sources exceed the adjustment range in the direction opposite to the rest, the mean value DSUBmean is appropriately shifted, expanding in this way the range of the adjustment current sources in order to compensate the relatively larger current mismatch.

In the foregoing specification, the invention has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative rather than a restrictive sense.

The invention claimed is:

1. A sensor arrangement, comprising
   a current mirror structure being connected to an input current path and to a plurality of output current paths and being configured to provide a respective base current at each of the output current paths based on an input current at the input current path;
   for each of the output current paths, a respective adjustment current source that is digitally controllable and is connected to the respective output current path for adjusting the base current of said output current path;
   for each of the output current paths, a current biased sensor element coupled in said output current path;
   a selection element for selectively connecting one of the output current paths to an evaluation block based on a selection signal;
   the evaluation block that is configured
      to generate a sensing value corresponding to a resulting current in the connected output current path;
      to compare the sensing value with an average value; and
      to update the average value based on the sensing value; and
   a digital control adapted for generating the selection signal and for digitally adjusting the respective adjustment current source of the connected output current path based on the comparison result.

2. The sensor arrangement according to claim 1, wherein the adjustment current sources are implemented as current digital-to-analog converters and wherein the digital control is adapted to provide digital adjustment values to the adjustment current sources.

3. The sensor arrangement according to claim 1, wherein the digital control is adapted to sequentially connect each of the output current paths to the evaluation block by providing the selection signal to the selection element.

4. The sensor arrangement according to claim 1, wherein the digital control is adapted to commonly adjust an operating range of the adjustment current sources.

5. The sensor arrangement according to claim 1, wherein the evaluation block is configured
   to generate the sensing value as a voltage over a sensing resistor resulting from the current in the connected output current path;
   to sample the sensing value with a sampling capacitor during a sampling phase;
   to compare the voltage over the sampling capacitor with an average voltage over an average capacitor during a comparison phase within the sampling phase, the average voltage corresponding to the average value; and
   to update the average value by performing a charge transfer between the sampling capacitor and the average capacitor during an averaging phase after the sampling phase.

6. The sensor arrangement according to claim 5, further comprising a main current digital-to-analog converter for generating the input current based on a digital main current value, wherein the sensor arrangement or the main current digital-to-analog converter is configured to adjust a value of the sensing resistor based on the digital main current value.

7. The sensor arrangement according to claim 6, wherein the sensor arrangement or the main current digital-to-analog converter is configured to increase the value of the sensing resistor if the digital main current value decreases, and to decrease the value of the sensing resistor if the digital main current value increases.

8. The sensor arrangement according to claim 1, further comprising a main current digital-to-analog converter for generating the input current based on a digital main current value, wherein the main current digital-to-analog converter is configured to perform a range adjustment for each of the adjustment current sources by adjusting a bias current of the adjustment current sources based on the digital main current value.

9. The sensor arrangement according to claim 1, wherein the selection element is adapted to selectively connect the output current paths to the evaluation block or to a dummy load based on the selection signal.

10. The sensor arrangement according to claim 1, wherein the current biased sensor elements comprise at least one of the following:
    Hall sensors;
    resistance temperature detectors;
    magnetoresistive sensors;
    MEMS transducers;
    NOx sensors;
    sensors, which additionally call for matching of their biasing conditions.

11. A method for operating a sensor arrangement, the method comprising:
    providing respective base currents at each of a plurality of output current paths based on an input current at an input current path;
    for each of the output current paths, adjusting the base current of said output current path with an associated adjustment current source that is digitally controllable and is connected to said output current path;
    for each of the output current paths, providing the adjusted base current to a current biased sensor element coupled in said output current path;
    selecting one of the output current paths based on a selection signal;
    generating a sensing value corresponding to the adjusted base current in the selected output current path;
    comparing the sensing value with an average value;
    digitally controlling the respective adjustment current source of the selected output current path based on the comparison result; and
    updating the average value based on the sensing value.

12. The method according to claim 11, wherein the selection signal is generated such that each of the output current paths is selected in a sequential fashion.

13. The method according to claim 11, wherein an operating range of the adjustment current sources is commonly adjusted.

14. The method according to claim 11, further comprising
generating the input current based on a digital main current value;
generating the sensing value as a voltage over a sensing resistor resulting from the adjusted base current in the selected output current path; and
adjusting a value of the sensing resistor based on the digital main current value.

15. The method according to claim 14, wherein
the value of the sensing resistor is increased if the digital main current value decreases; and
the value of the sensing resistor is decreased if the digital main current value increases.

* * * * *